United States Patent [19]

Coleman et al.

[11] 4,306,400
[45] Dec. 22, 1981

[54] PACKAGING MACHINE WITH CONTINUOUS MOTION TOP SEALER

[75] Inventors: Ronald K. Coleman; Charles A. Burton, both of Columbus, Ohio

[73] Assignee: Rexham Corporation, New York, N.Y.

[21] Appl. No.: 119,310

[22] Filed: Feb. 7, 1980

[51] Int. Cl.³ .................... B65B 7/06; B65B 31/04
[52] U.S. Cl. .................................. 53/373; 53/384; 156/583.1
[58] Field of Search ............... 53/373, 384; 156/583.1, 156/583.2

[56] References Cited

U.S. PATENT DOCUMENTS

| | | | |
|---|---|---|---|
| 3,220,161 | 11/1965 | Lohse et al. | 53/373 |
| 3,230,687 | 1/1966 | Nutting et al. | 53/180 |
| 3,501,888 | 3/1970 | Egli et al. | 53/384 X |
| 3,568,402 | 3/1971 | Lense et al. | 53/384 X |
| 3,830,681 | 8/1974 | Wilson | 53/373 X |
| 4,081,942 | 4/1978 | Johnson | 53/79 X |
| 4,240,238 | 12/1980 | Girardier | 53/373 |

Primary Examiner—Robert D. Baldwin
Attorney, Agent, or Firm—Leydig, Voit, Osann, Mayer & Holt, Ltd.

[57] ABSTRACT

Sealing heads for heat sealing the tops of continuouously movable upright pouches are spaced angularly around a continuously rotatable turret and seal the pouches after steam has been introduced into the pouches and as the pouches move in an arcuate path extending around the turret. Each sealing head includes a pair of heated sealing bars and further includes a cam-operated actuator which sequentially lowers the bars, closes the bars, opens the bars, and then raises the bars as the bars rotate with the turret.

12 Claims, 16 Drawing Figures

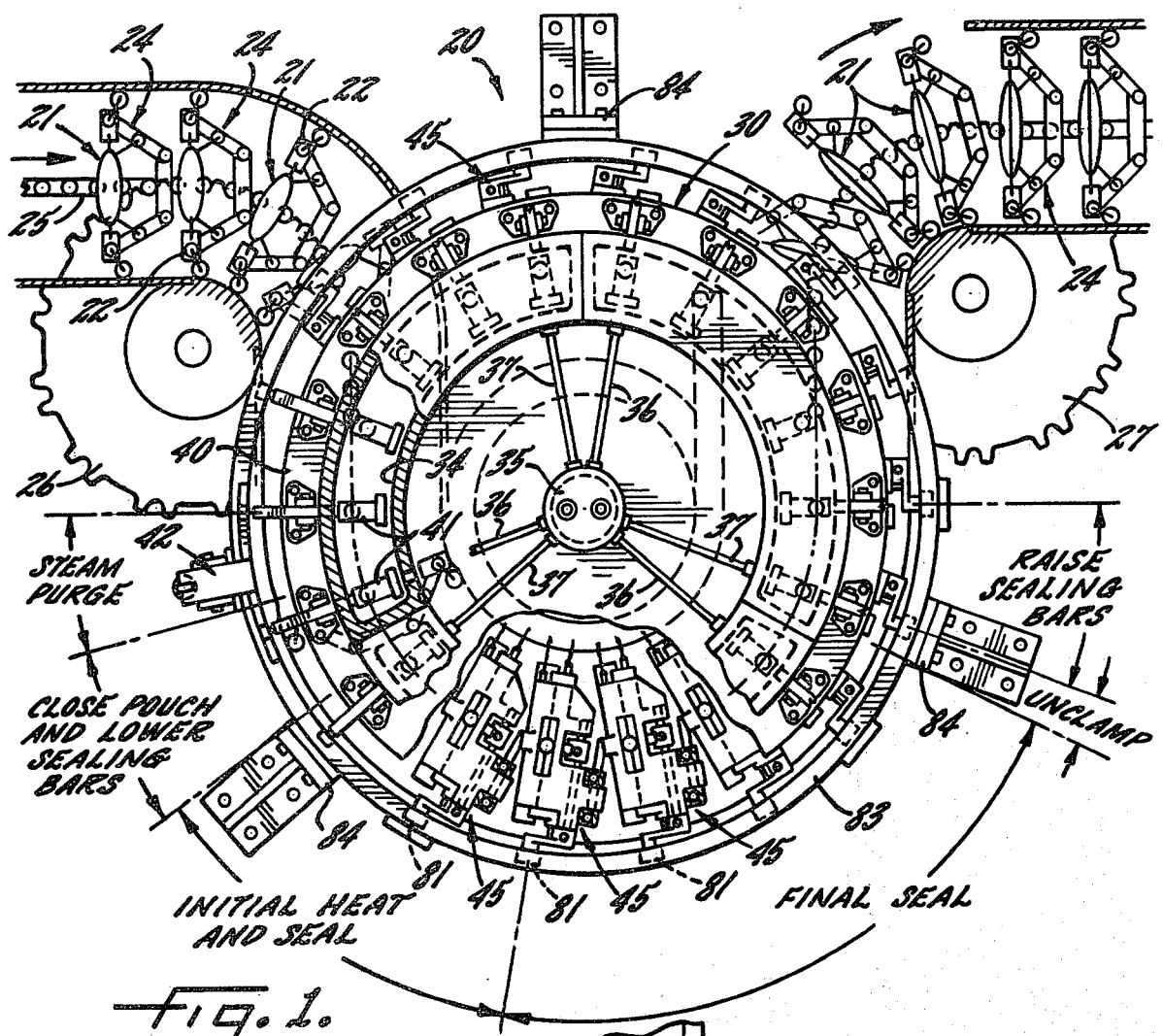

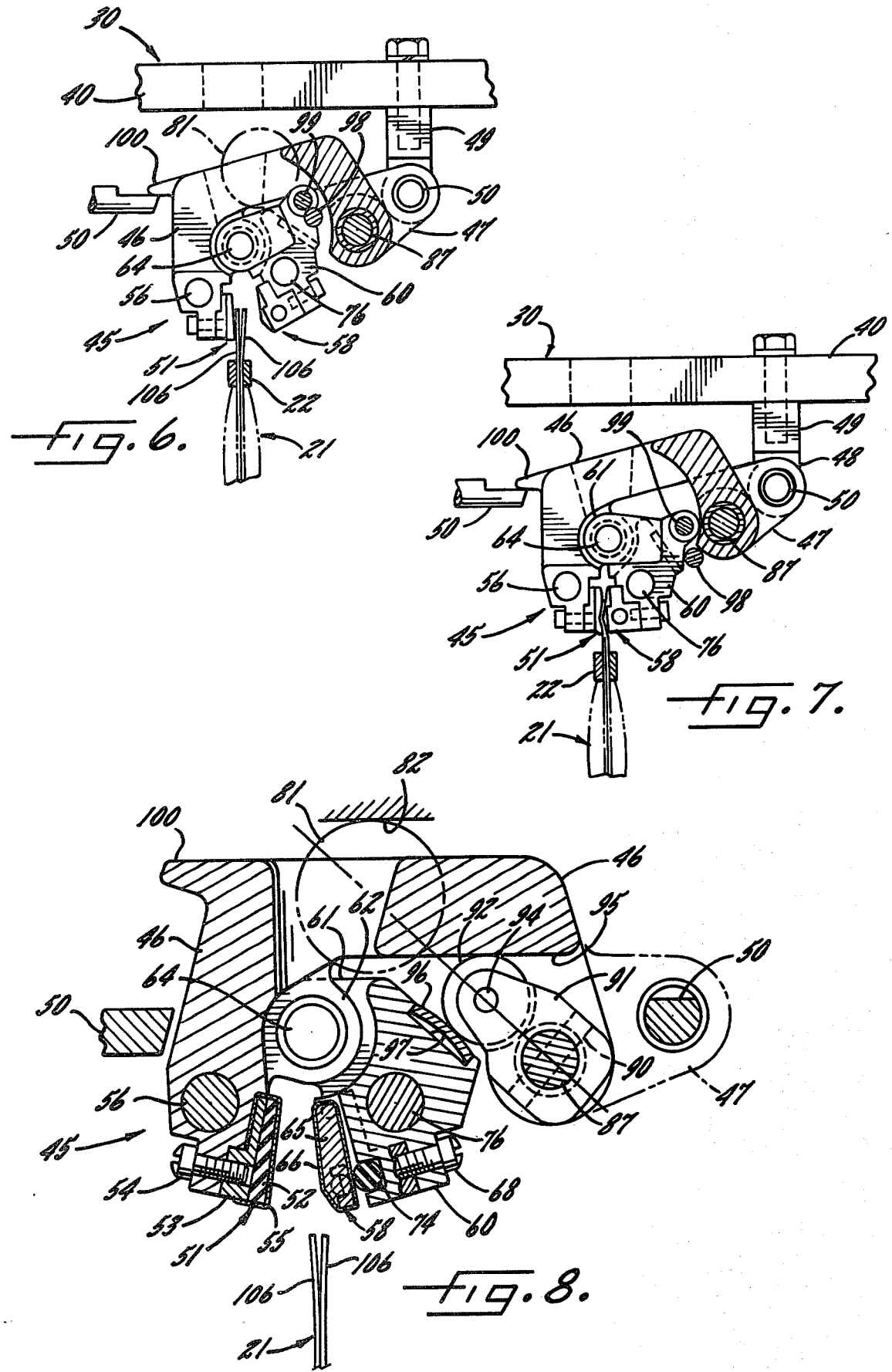

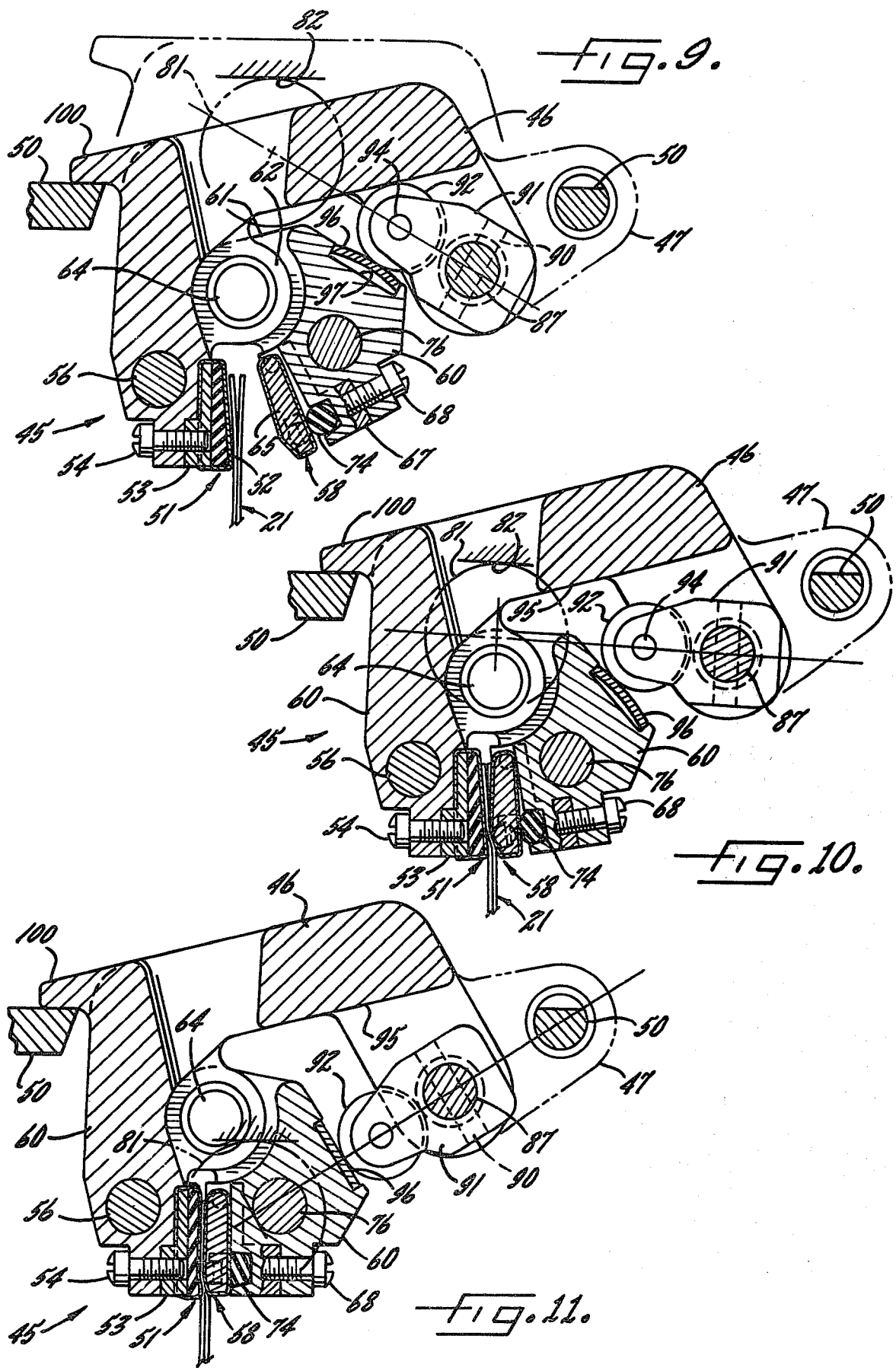

PACKAGING MACHINE WITH CONTINUOUS MOTION TOP SEALER

BACKGROUND OF THE INVENTION

This invention relates to a mechanism for use with a packaging machine for sealing the tops of flexible pouches as the pouches are advanced at high speed and with continuous motion along a predetermined path. Such a sealing mechanism includes a plurality of sealing heads which track the moving pouches, each of the heads having a pair of heated bars which seal the pouch.

A packaging machine with a continuous motion top sealing mechanism is disclosed in Nutting et al U.S. Pat. No. 3,230,687. That sealing mechanism, however, is complex and expensive and requires a considerable amount of floor space in the lengthwise direction of the machine. In addition, each of the sealing heads of the Nutting et al mechanism has sealing bars which move in separate orbital paths and thus it is difficult to maintain precise control over the bars and particularly with respect to the sealing pressure which is exerted by the bars.

The invention has more particular reference to a top sealing mechanism for a packaging machine in which steam is introduced into the pouches just prior to the time the pouches are sealed. A packaging machine in which the pouches are flushed with steam is disclosed in Johnson U.S. Pat. No. 4,081,942. The Johnson machine, however, operates with intermittent motion rather than with continuous motion and thus the pouches dwell while their tops are being sealed.

SUMMARY OF THE INVENTION

The general aim of the present invention is to provide a new and improved continuous motion top sealing mechanism which is of relatively simple and compact construction and which is capable of forming good seals at high speeds even when steam is present in the pouches during the sealing operation.

A further object of the invention is to provide a continuous motion sealing mechanism in which the bars of each sealing head are paired with one another in such a manner that the bars of each head move in a common path so as to simplify the mechanism and to enable more positive control of the sealing pressure exerted by the bars.

A more detailed object is to provide a sealing mechanism in which the sealing heads are mounted on a continuously rotatable turret and track the pouches as the latter move in an arcuate path around the turret.

Still another object of the invention is to provide a unique sealing head in which a single actuator is effective first to lower the sealing bars of the head into straddling relation with the top of a pouch and then to close the bars to seal the pouch.

The invention also resides in the novel construction which permits condensate to be driven out of the seal area of each pouch as the sealing bars are closed and which permits substantially uniform sealing pressure to be exerted on the pouch after the bars have been closed.

These and other objects and advantages of the invention will become more apparent from the following detailed description when taken in conjunction with the accompanying drawings.

BRIEF DESCRIPTION OF THE DRAWINGS

FIG. 1 is a fragmentary top plan view of a packaging machine equipped with a new and improved sealing mechanism incorporating the unique features of the present invention.

FIG. 2 is a fragmentary side elevational view of the machine shown in FIG. 1.

FIGS. 6 and 7 are view similar to FIG. 5 but show the parts in successively moved positions.

FIG. 8 is an enlarged fragmentary cross-section taken substantially along the line 8—8 of FIG. 3.

FIGS. 9, 10 and 11 are views similar to FIG. 8 but show the parts in successively moved positions.

DETAILED DESCRIPTION OF THE PREFERRED EMBODIMENT

Figure 3:
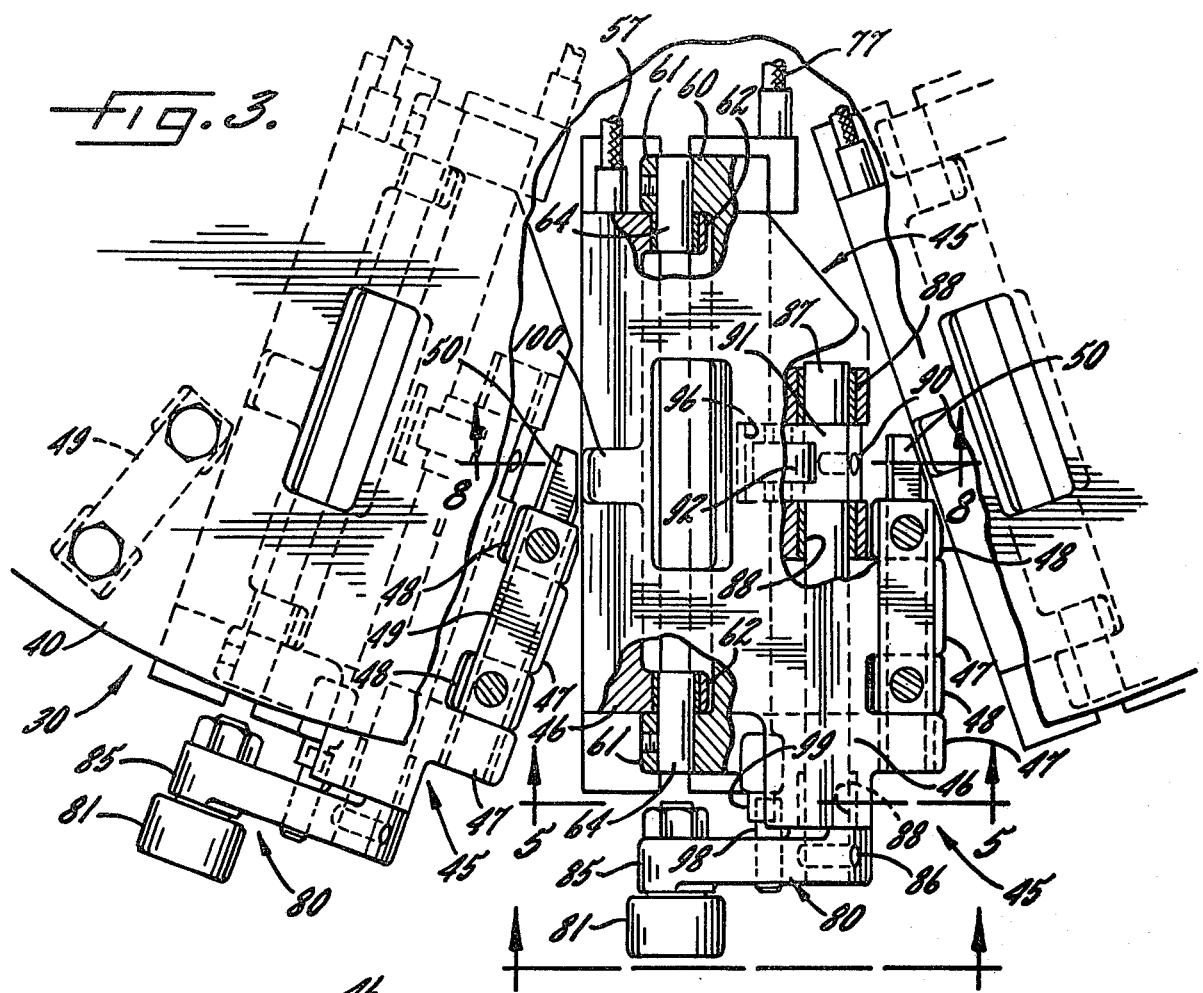
FIG. 3 is an enlarged top plan view of part of the sealing mechanism with certain parts being broken away and shown in section.

As shown in the drawings for purposes of illustration, the invention is embodied in a mechanism 20 which forms part of a continuous motion packaging machine and which serves to close and seal the tops of pouches 21 (FIG. 2) after the latter have been filled by the machine. Each pouch comprises a pair of opposed side panels made of flexible thermoplastic material and joined along their sides and bottoms by heat seals. In this particular instance, the pouches are filled with a food product such as, for example, a mixture of meat chunks and sauce.

Figure 14:
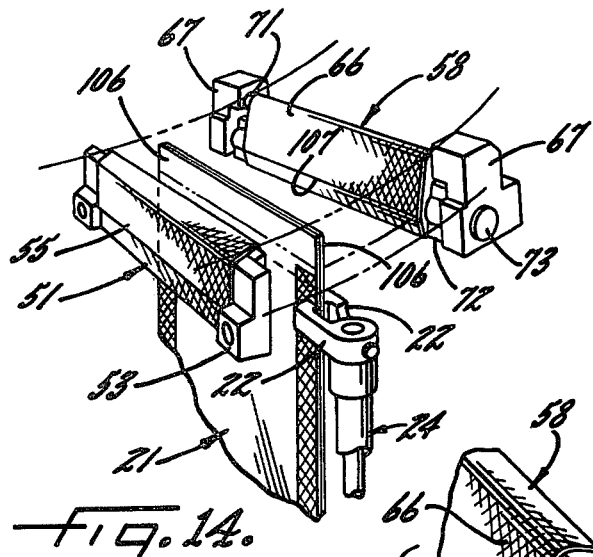
FIG. 14 is a perspective view showing the relationship between the sealing bars and a pouch.

Each filled pouch 21 is held in an upright position by a pair of clamps 22 (FIGS. 2 and 14) which grip the edge margins of the pouch near the top thereof. Each pair of clamps forms part of a carrier 24 which is attached to two vertically spaced chains 25 adapted to be advanced from left-to-right (FIG. 1) with high speed continuous motion and adapted to be guided by sprockets 26 and 27 during such advance. The two clamps of each carrier are adapted to be moved toward one another to cause the pouch to open widely prior to and during filling (see the three leftmost pouches in FIG. 1) and then are adapted to be moved away from one another to close the pouch and stretch the top thereof before the top is sealed. Clamps which move toward and away from one another to open and close pouches are disclosed in Lense et al U.S. Pat. No. 3,568,402. Also, the specific carriers 24 of the present machine are disclosed in Russell et al United States application Ser. No. 119,221 filed Feb. 7, 1980, now U.S. Pat. No. 4,263,768, entitled Pouch Carrier and assigned to the assignee of the present invention. The details of the carriers do not form part of the present invention and thus further description of the carriers is not necessary to enable an understanding to be gained of the sealing mechanism 20.

As the chains 25 advance from the sprockets 26 to the sprockets 27, they engage and rotate a pair of vertically spaced sprockets 28 (FIG. 2) which form part of a turret 30 supported on a stationary base 31. The turret includes a vertical column 32 which is secured to the sprockets and which thus is rotated in a counterclockwise direction and in timed relationship with the advance of the chains and the pouches 21. The chains and the pouches move in an arcuate path which extends around approximately the forward 180 degrees of the sprockets 28 or from approximately a nine o'clock position to approximately a three o'clock position as viewed in FIG. 1.

Fixed to the upper end of the column 32 is a circular manifold 34 (FIGS. 1 and 2) which receives steam from a suitable source via a rotary coupling 35 located at the center of the manifold. A plurality (herein, three) of angularly spaced pipes 36 deliver steam from the coupling to a chamber within the manifold while a similar number of lower pipes 37 return condensate from the chamber.

Steam is introduced into each filled pouch 21 just before the latter is sealed in order to purge the pouch of air and to subsequently create a vacuum in the pouch to preserve the food product. To introduce the steam into the pouches, eighteen nozzles 38 (FIG. 2) communicate with the manifold 34 and extend downwardly through holes formed in a circular plate 40 which underlies the manifold and which is secured to the column 32 so as to form part of the turret 30. The upper end of each nozzle normally is closed by a flapper valve 41.

As each pouch 21 reaches the nine o'clock position (FIG. 1) and starts to travel in an arcuate path around the sprockets 28, the pouch moves into registry with one of the nozzles 38. As the turret 30 rotates, the pouch and the alined nozzle move in unison with the pouch being held in an open position by the clamps 22. During such movement, the flapper valve 41 at the upper end of the nozzle is opened by mechanism indicated generally at 42 in FIG. 2. The valve 41 is held open for a short period of time (e.g., fifteen degrees movement of the turret 30) in order to introduce steam into the pouch. While steam is still being ejected from the nozzle, the clamps 22 are moved away from one another to stretch the top of the pouch to a closed position and restrict the escape of steam out of and the entry of air into the pouch.

In accordance with the present invention, the turret 30 forms part of the top sealing mechanism 20 and carries a plurality of unique angularly spaced sealing heads 45 which seal the tops of the pouches 21 as the latter move in an acruate path extending around the turret. The sealing heads are relatively simple, are comparatively easy to control and form good seals at high speeds even though the pouches are subjected to steam immediately prior to sealing. By spacing the sealing heads 45 around the turret, the amount of floor space which the sealing mechanism 20 requires in the lengthwise direction of the packaging machine is significantly reduced.

More specifically, eighteen sealing heads 45 are spaced equally around the turret 30 and each is carried on and mounted beneath the plate 40. The angular spacing between the sealing heads is equal to the spacing between the pouches 21 and, in addition, the sealing heads are positioned radially so as to register with the pouches as the latter move in an arcuate path extending around the forward half of the turret. Thus, successive sealing heads move into overlying relation with successive pouches as the pouches reach a nine o'clock position (FIG. 1) and begin to travel in an arcuate path. Each sealing head moves in unison with and tracks its respective pouch as the pouch continues around the arcuate path and then leaves the pouch when the latter reaches a three o'clock position and proceeds toward the sprockets 27.

The sealing heads 45 are identical to each other and thus only a single head need be described. As shown in FIGS. 3 and 8, each sealing head includes a main body 46 located beneath the plate 40 and extending in a radical direction relative to the turret 30. Ears 47 project laterally from one side of the body and are interleaved with spaced ears 48 (FIG. 3) which form part of a depending bracket 49 secured to the plate 40. A horizontal pin 50 extends through the ears 48 and 49 and mounts the body 46 for up and down swinging relative to the bracket 49.

The side of the body 46 opposite the ears 47 carries a sealing bar 51 (FIG. 8). The latter comprises a radially extending elastomeric pad 52 which is bonded to a metal plate 53 which, in turn, is secured rigidly to the body by screws 54. A Teflon jacket 55 covers the pad 52 and is adapted to engage the upper end portion of one of the side panels of the pouch 21. The bar 51 is adapted to be heated by an electrical resistance heating element 56 embedded in the body 46 and connected by an electrical cable 57 (FIG. 3) to a slip ring assembly (not shown) located at the center of the turret 30 and connected to a suitable voltage source.

Figure 15:
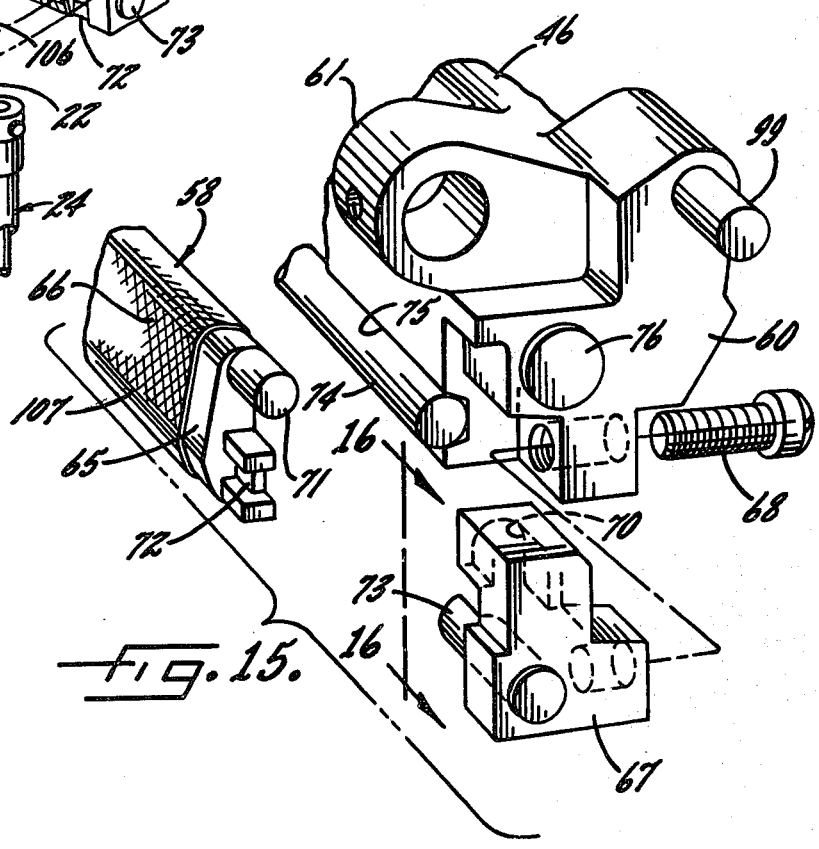
FIG. 15 is an exploded perspective view of certain parts of one of the sealing heads.

A second sealing bar 58 (FIGS. 12 and 15) coacts with the bar 51 to seal the pouch 21 and is carried on a radially extending mounting member or shoe 60 (FIGS. 8 and 15). Laterally projecting ears 61 (FIG. 3) are formed on the ends of the mounting shoe and are alined with a pair of ears 62 formed on the body 46. Pins 64 project through the ears 61 and 62 and mount the shoe 60 for upward and downward swinging on the body 46 about a horizontal axis extending parallel to the pin 50.

Figure 16:
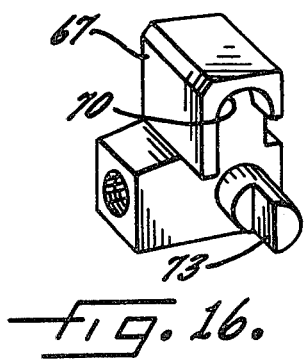
FIG. 16 is an elevational view as taken substantially along the line 16—16 of FIG. 15.

As shown in FIG. 15, the sealing bar 58 comprises a metal block 65 which is covered with a Teflon jacket 66. Mounting brackets 67 (FIGS. 14 to 16) are secured to the ends of the shoe 60 by screws 68 and each is formed with a downwardly opening socket 70 (FIG. 16) which rotatably receives a horizontal trunnion 71 (FIG. 15) projecting from the end of the block 65. A generally I-shaped retainer 72 projects from each end of the block 65 and interfits with a half-round rod 73 projecting from the adjacent mounting bracket 67. The retainers 72 and the rods 73 coact to hold the trunnions 71 upwardly within the sockets 70 while permitting the trunnions to turn within the sockets. In this way, the sealing bar 58 is capable of swinging or pivoting relative to the mounting shoe 60 and the brackets 67 about the axes of the trunnions 71. The retainers 72 engage the rods 73 to limit swinging of the bar 58 in a clockwise direction (FIG. 15).

The sealing bar 58 is urged toward the bar 51 by an elastomeric rod 74 (FIGS. 12 and 15) which is located between the mounting shoe 60 and one face of the bar 58. The rod 74 is substantially co-extensive in length with the bar 58 and is captivated within a groove 75 formed in the mounting shoe.

To heat the bar 58, an electrical resistance heating element 76 (FIG. 8) is embedded in the mounting shoe 60 and is adapted to be energized via an electrical cable 77 (FIG. 3). The cable is connected to the slip ring assembly at the center of the turret 30.

In keeping with the invention, each sealing head 45 is equipped with a reversible actuator 80 (FIG. 3) which is uniquely arranged so as to first lower the sealing bars 51 and 58 of the head into straddling relation with the top of a pouch 21 and then to close the bars to seal the pouch. Thereafter, the actuator opens the bars and then raises the bars. Herein, the actuator includes a cam follower element in the form of a roller 81 located at the outer end of the sealing head 45 and positioned to ride in a cam track 82 (FIGS. 2 and 8). The cam track is defined by a groove formed in a stationary ring 83 (FIG. 2) which encircles the turret 30 and which is supported by posts 84 upstanding from the base 31.

Figure 4:
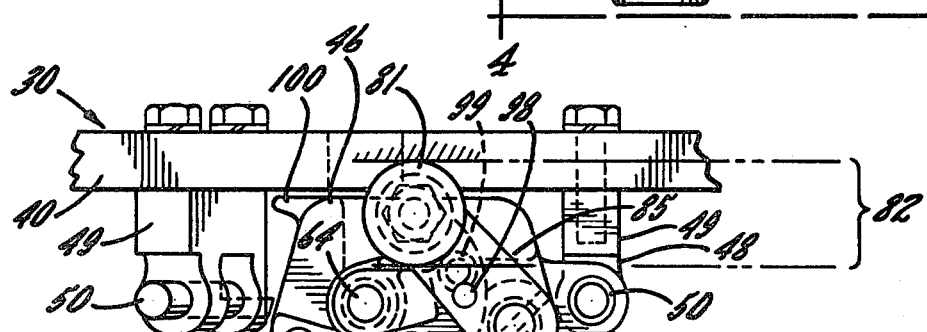
FIG. 4 is an elevational view as taken along the line 4—4 of FIG. 3.

As shown in FIGS. 3 and 4, the cam follower 81 is connected to the free end of an arm 85 whose other end is pinned rigidly at 86 to the outer end of a horizontal shaft 87. The shaft 87 is received within the main body 46 of the sealing head 45 and is rotatably supported within bushings 88 (FIG. 3) carried by the body.

Pinned rigidly at 90 (FIG. 8) to the inner end portion of the shaft 87 is a U-shaped bracket 91 which rotatably supports a part in the form of a roller 92 adapted to rotate about a horizontal axis 94. When the sealing bars 51 and 58 are in their raised positions as shown in FIG. 8, the roller 92 engages a flat surface 95 of the body 46 and also engages a leaf spring 96 which is carried by the mounting shoe 60 and which extends lengthwise of the shoe a short distance beyond the sides of the roller 92. The leaf spring is captivated within a groove 97 in the shoe and, in this instance, is bowed upwardly about its longitudinal centerline as shown in FIG. 8. The spring could, however, be bowed upwardly about its transverse centerline.

OPERATION

To best gain an understanding of the operation of the sealing mechanism 20, assume that a given sealing head 45 is traveling counterclockwise with the turret 30 and is located in approximately a twelve o'clock position (FIG. 1). When the sealing head is so positioned, the cam track 82 holds the cam follower 81 in an extreme upper position so that the cam follower, the arm 85 and the shaft 87 are located as shown in FIG. 4. With the shaft 87 in the position shown in FIG. 4, the roller 82 bears against the surface 95 of the body 46 and holds the body and the sealing bar 51 in an upwardly raised position shown in FIGS. 4, 5 and 8, the roller preventing the body from pivoting downwardly about the pin 50. Because the body 46 is in a raised position, the pins 64 are held in an elevated position and keep the mounting shoe 60 and the sealing bar 58 raised upwardly (see FIGS. 4, 5 and 8). In addition, a pin 98 (FIGS. 4 and 5) projecting inwardly from the arm 85 engages the lower side of a pin 99 projecting outwardly from the mounting shoe 60. Such engagement prevents the shoe 60 from swinging downwardly (or clockwise as viewed in FIG. 5) about the pins 64 and thus prevents the bar 58 from closing on the bar 51.

Accordingly, the coaction between the cam follower 81 and the cam track 82 holds the sealing bars 51 and 58 in raised positions disposed above the level of the pouches 21. Also, the pins 98 and 99 serve to keep the sealing bar 58 in an open position with respect to the sealing bar 51.

Figure 5:
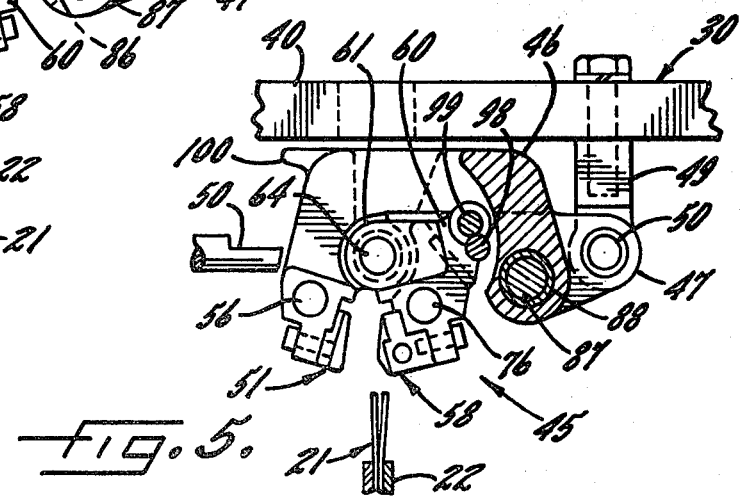
FIG. 5 is a fragmentary cross-section taken substantially along the line of 5—5 of FIG. 3.

As each sealing head 45 rotates to the nine o'clock position (FIG. 1), the sealing bars 51 and 58 move into alinement with the top of a pouch 21 being advanced by the chains 25 but the bars are located above the pouch as shown in FIGS. 4, 5 and 8. While the bars are in this position and as the pouch continues to advance, the flapper 41 (FIG. 2) is opened to admit steam into the pouch through the nozzle 38. Shortly before the flapper 41 is closed, the pouch is stretched by the clamps 22 to close the top of the pouch.

At about the same time, the cam track 82 causes the follower 81 to lower and effect counterclockwise (FIG. 4) swinging of the arm 85 and counterclockwise turning of the shaft 87. As an incident thereto, the roller 81 swings about the axis of the shaft 87 and permits the body 46 of the sealing head 45 to swing downwardly under its own weight about the pin 50 from the position shown in FIGS. 4, 5 and 8 to the position shown in FIGS. 6 and 9. Such swinging lowers the seal bar 51 to a position directly alongside the trailing side of the top of the pouch. The pins 64 and the mounting shoe 60 swing downwardly in unison with the body 46 and thus the seal bar 58 is lowered to a position in which the bar 58 is located in opposing relationship with the leading side of the top of the pouch 21. As the body 46, the shoe 60 and the arm 85 swing downwardly about the pin 50, the pins 98 and 99 also swing downwardly in unison and thus the pin 98 remains in underlying relation with the pin 99 to keep the shoe 60 from swinging clockwise about the pins 64. This keeps the sealing bar 58 spaced from or open with respect to the bar 51 and allows the two bars to swing downwardly into straddling relation with the pouch 21 (see FIGS. 6 and 9).

The body 46 of the sealing head 45 swings downwardly about the pin 50 until a lug 100 (FIGS. 8 and 9) on the body engages and is stopped by the inner end of the pin 50 of the adjacent trailing sealing head 46. Such engagement stops further downward swinging of the body 46 and holds the sealing bar 51 at a fixed elevation in contact with the trailing side of the pouch (see FIGS. 6 and 9). The cam track 82, however, continues to lower the follower 81 and thus continues to swing the arm 85 counterclockwise and to turn the shaft 87 counterclockwise. As the arm swings, the pin 98 moves downwardly away from the pin 99 to permit the mounting shoe 60 and the sealing bar 58 to swing clockwise about the pins 64 and relative to the body 46 and the sealing bar 51. At the same time, counterclockwise turning of the shaft 87 causes the roller 92 to swing angularly from the position shown in FIG. 9 to the position shown in FIG. 10. The roller thus acts against and through the leaf spring 96 and positively turns the shoe 60 clockwise about the pins 64 to force the seal bar 58 against the leading side of the pouch 21 as shown in FIG. 10. Accordingly, the seal bar 58 is moved to a closed position with respect to the bar 51 and, as a result, the top of the pouch becomes sandwiched between the two bars.

Figure 12:
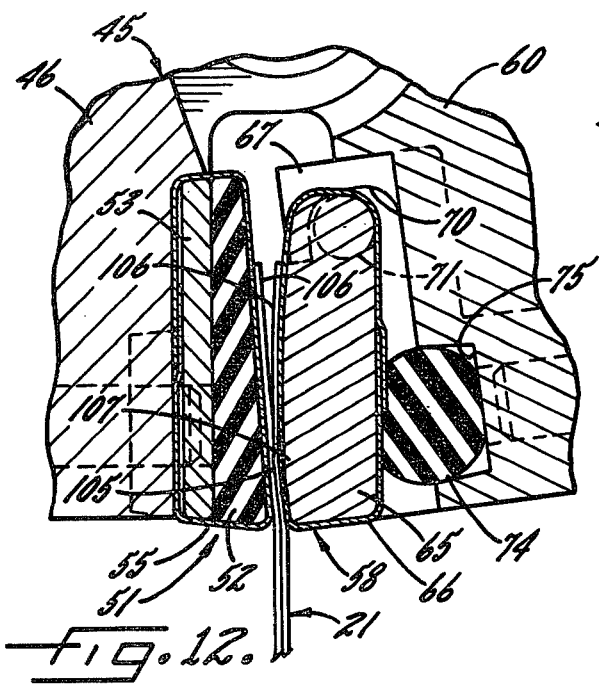
FIGS. 12 and 13 are cross-sectional views showing two successive positions of the sealing bars of each sealing head.

The cam track 82 causes the seal bars 51 and 58 to be located in the positions shown in FIGS. 10 and 12 during the time the sealing head 45 is moving through the angular distance labeled "Initial Heat And Seal" in FIG. 1. During this time, the seal bars form an essentially line-type seal 105 (FIG. 12) across the upper end portion of the pouch below the extreme top fins 106 thereof in order to hold the steam in the pouch and to prevent air from entering the pouch. The fins 106 of the pouch above the line seal 105 are not, however, immediately pressed and sealed together but instead are left open and are subjected to the heat from the bars 51 and 58. As a result, moisture which may have accumulated between the fins 106 because of condensation of the steam is vaporized by the heat and is driven upwardly from between the fins. This leaves the fins in a dry condition so that the fins may be subsequently sealed together in a cosmetically attractive manner and without the formation of blisters which otherwise would occur if water droplets were present between the fins at the time of sealing.

The foregoing is achieved in part by virtue of the shape of the seal bars 51 and 58 and in part by virtue of the mounting of the seal bar 58. As shown in FIG. 12, the active face of the pad 52 of the seal bar 51 is not disposed in a vertical plane but instead is inclined upwardly and rearwardly. The active face of the block 65 of the seal bar 58 is substantially V-shaped and thus the apex of the V defines a pronounced line 107 (FIG. 15) across the block 65 adjacent the lower end portion thereof. When the seal bar 58 is first closed upon the seal bar 51, the elastomeric rod 74 biases the seal bar 58 clockwise about the axis of the trunnions 71 (FIG. 12) and causes the line 107 along the block 65 to engage the pouch and form the line-type seal 105. The upper end portion of the block 65, however, does not press the fins 106 against the inclined face of the pad 52 and thus the fins remain separated so that the heat from the bars can drive off moisture from between the fins. In this way, the pouch is initially sealed at 105 to hold the steam in the pouch but the fins 106 are dried so that the fins subsequently can be sealed together with a neatly appearing cosmetic seal.

Figure 13:
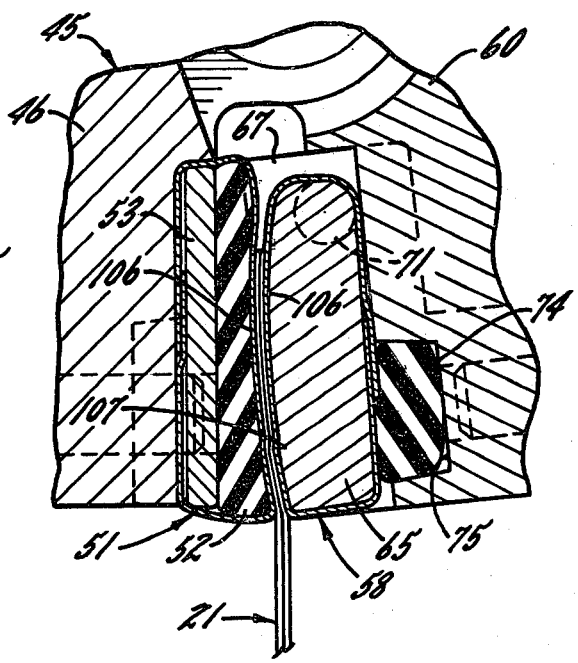

Cosmetic sealing of each pouch 21 is effected during the time the pouch and the associated sealing head 45 are being advanced through the angular distance or range labeled "Final Seal" in FIG. 1. When the sealing head first enters this range, the cam track 82 lowers the follower 81 even further to cause the arm 85 to rotate the shaft 87 further in a counterclockwise direction from the position shown in FIG. 10 to the position shown in FIG. 11. As a result, the roller 92 turns about the axis of the shaft 87 and forces the mounting shoe 60 to swing clockwise about the axis of the pins 64. The mounting shoe thus is swung to a fully clamped position shown in FIGS. 7, 11 and 13 and, as the shoe reaches this position, the sealing bar 58 presses against the pouch 21 and the sealing bar 51 and rocks counterclockwise about the axes of the trunnions 71. Such rocking, together with the swinging of the shoe 60 about the axis of the pins 64, brings virtually the full face of the bar 58 into contact with the upper end portion of the pouch 21 so that the fins 106 thereof are fully pressed between and sealed by the bars 51 and 58 in order to effect a neatly appearing seal across the top of the pouch. Such swinging also causes compression of the elastomeric pad 52 of the seal bar 51 and of the elastomeric rod 74 located behind the bar 58 (see FIG. 13). As a result, the pad and the rod exert a biasing force on the shoe 60 and tend to swing the shoe counterclockwise about the axis of the pins 64.

Counterclockwise swinging of the shoe 60 is prevented, however, by the roller 92 and the leaf spring 96. As illustrated in the drawings, the axis 94 of the roller 92 swings past or toggles over the line extending between the pins 64 and the shaft 87 when the roller is moved from the position shown in FIG. 10 to the position shown in FIG. 11. As the roller moves to the position shown in FIG. 11, it deflects the leaf spring 96. Such deflection along with the deflection of the elastomeric rod 74 enables the seal bar 58 to exert a controlled and substantially uniform clamping pressure on the pouch 21. Because of the overcenter toggle action undertaken by the roller 92, the roller exerts a substantially uniform holding force on the shoe 60 and such force remains virtually constant regardless of minor variations which might be present in the cam track 82. In other words, the roller 92, having toggled overcenter, will tend to remain in the position shown in FIG. 11 even if minor variations in the cam track 82 result in slight upward or downward movement of the cam follower 81. Accordingly, substantially constant sealing pressure is exerted on the pouch 21 during the time the final or cosmetic seal is being formed.

When each sealing head 45 passes approximately the four o'clock position shown in FIG. 1, the cam track 82 raises the follower 81 so as to effect clockwise swinging of the arm 85 and clockwise turning of the shaft 87. After the arm has been swung through a short distance, the pin 98 on the arm picks up and engages the pin 99 on the mounting shoe 60. This causes the mounting shoe to swing counterclockwise about the pins 64 to the position shown in FIG. 9 and release the sealing bar 58 from the pouch 21. With further counterclockwise turning of the turret 30 and the sealing head 45, the cam track 82 raises the follower 81 by an additional distance to cause the shaft 87 to turn clockwise from the position shown in FIG. 9 to the position shown in FIG. 8. Accordingly, the roller 92 engages the surface 95 of the body 46 and swings the body clockwise about the pin 50 to raise the sealing bar 51 above the pouch and to its upper position shown in FIG. 8. The sealing bar 58 is raised in unison with the bar 51 because the engagement between the pins 98 and 99 prevents the mounting shoe 60 from swinging about the pins 64 and forces the shoe to move upwardly with the body 46.

Raising of the bars 51 and 58 above the pouch 21 is effected prior to the time the sealing head 45 and the pouch reach the three o'clock position (FIG. 1). Once this position has been reached, the pouch is advanced away from the turret 30 by the chains 25 while the sealing head is advanced around the rear side of the turret preparatory to picking up another pouch.

Thus, the present invention brings to the art a unique continuous motion top sealing mechanism 20 in which the sealing heads 45 are spaced angularly around a turret 30 and in which the sealing bars 51 and 58 of each head are paired with one another so that both bars move in a common path. As a result of mounting the sealing heads on the turret, the sealing mechanism takes up comparatively little floor space in the lengthwise direction of the packaging machine. Because the sealing bars of each head move in a common path, the bars and the pressure exerted thereby can be precisely controlled in a relatively simple manner. Indeed, the single acutator 80 is effective to lower, close, open and then raise the bars and to cause the bars to exert substantially uniform pressure on the pouch. The specific construction of the bars and the manner of closing the bar 58 allows the formation of hermetically tight and cosmetically acceptable seals even when steam is present in the pouch during the sealing operation.

We claim:

1. Mechanism for sealing the tops of upright pouches adapted to be advanced continuously at a predetermined speed and in spaced relationship around an arcuate path of less than 360 degrees, said mechanism comprising a turret supported to rotate about an upright axis which coincides with the center of said path, a plurality of sealing heads carried by said turret in overlying relation with said path and spaced angularly from one another in accordance with the spacing of said pouches, means for continuously rotating said turret about said axis at a speed and in a direction to cause said sealing heads to match the speed and direction of said pouches as the latter are advanced along said path, each of said sealing heads comprising a pair of opposing heated sealing bars, at least one of said sealing bars being mounted for movement between open and closed positions with respect to the other sealing bar, each pair of sealing bars being mounted on said turret for movement between a raised position in which the bars are spaced upwardly from the underlying pouch and a lowered position in which the bars straddle opposite sides of the top of such pouch, and means for moving each pair of said sealing bars from said raised position to said lowered position, for then moving said one bar from said open position to said closed position and then back to said open position, and for thereafter moving said bars back to said raised position as said bars are advanced around said path.

2. Mechanism as defined in claim 1 in which said sealing bars are mounted on said turret to swing between said raised and lowered positions about a first horizontal axis, said one bar being movable with said other bar and being mounted to swing relative to said other bar and between said open and closed positions about a second horizontal axis which extends parallel to said first horizontal axis.

3. Mechanism as defined in claim 1 in which said other bar is supported on said turret to swing upwardly and downwardly relative to said turret about a first horizontal axis, said one bar being movable with said other bar, said bars moving between said raised and lowered positions when said other bar is swung about said first horizontal axis, and means mounting said one bar to swing relative to said other bar and between said open and closed positions about a second horizontal axis which extends parallel to said first horizontal axis.

4. Mechanism as defined in claims 1, 2 or 3 in which said moving means comprise a stationary cam track which extends around at least part of said turret, a cam follower on each of said sealing heads and movable along said cam track during rotation of said turret, said track moving said follower as the latter moves along the track, and means connected between the cam follower and the sealing bars of each sealing head for moving said bars when said follower is moved by said track.

5. Mechanism as defined in claim 1 further including a sprocket carried by said turret and rotatable about said upright axis, said rotating means comprising a power-driven chain engageable with said sprocket and operable to turn said turret, and means on said chain for carrying said pouches.

6. Mechanism as defined in claims 1, 2 or 3 further including means carried by said turret for introducing steam into each pouch prior to movement of the overlying sealing bars from said raised position to said lowered position.

7. Mechanism as defined in claim 1 further including a member supporting said one sealing bar for movement between said open and closed positions relative to said other sealing bar, means mounting said one bar for pivoting on said member about a generally horizontal axis located adjacent the upper end portion of said one bar, and resiliently yieldable means acting between said one bar and said one member and urging said one bar to swing about the last-mentioned axis and toward said other bar.

8. Mechanism as defined in claim 7 in which said one sealing bar includes a sealing face which is substantially V-shaped in cross-section.

9. Mechanism for sealing the tops of upright pouches adapted to be advanced continuously at a predetermined speed and in spaced relationship around an arcuate path, said mechanism comprising a turret supported to rotate about an upright axis which coincides with the center of said path, a plurality of sealing heads carried by said turret in overlying relation with said path and spaced angularly from one another in accordance with the spacing of said pouches, means for continuously rotating said turret about said axis at a speed and in a direction to cause said sealing heads to match the speed and direction of said pouches as the latter are advanced along said path, each of said sealing heads comprising a pair of opposing heated sealing bars mounted on said turret to move downwardly and upwardly in unison between a raised position in which the bars are spaced upwardly from the underlying pouch to a lowered position in which the bars straddle the top of such pouch, one of said bars being mounted relative to the other bar to move toward and away from said other bar between open and closed positions, a reversible actuator connected to each sealing head, said actuator being operable when actuated in one direction to first move said sealing bars downwardly in unison from said raised position to said lowered position and thereafter to move one sealing bar toward said other sealing bar from said open position to said closed position, said actuator being operable when actuated in the reverse direction to first move said one sealing bar away from said other sealing bar to said open position and thereafter to move said sealing bars upwardly in unison to said raised position.

10. Mechanism as defined in claim 9 further including a stationary cam track extending around at least part of said turret and acting on said actuator to actuate the latter in either of two directions, said mechanism further including means acting independently of said cam track and positively holding said one sealing bar in its closed position during at least part of the time said one sealing bar is in its closed position.

11. Mechanism as defined in claim 9 in which said one sealing bar is mounted relative to the other bar to swing toward and away from the latter bar about a first predetermined axis, said actuator being swingable about a second axis paralleling said first axis and having a part which is operable to swing said one bar toward said other bar, said part swinging across the line extending between said first and second axes when said one bar is moved from its open position to its closed position.

12. Mechanism for sealing the tops of upright pouches adapted to be advanced continuously at a predetermined speed and in spaced relationship around an arcuate path, said mechanism comprising a turret supported to rotate about an upright axis which coincides with the center of said path, a plurality of sealing heads carried by said turret in overlying relation with said path and spaced angularly from one another in accordance with the spacing of said pouches, means for continuously rotating said turret about said axis at a speed and in a direction to cause said sealing heads to match the speed and direction of said pouches as the latter are advanced along said path, each of said sealing heads comprising a pair of opposing heated sealing bars mounted on said turret to swing downwardly and upwardly in unison about a first predetermined axis between a raised position in which the bars are spaced upwardly from the underlying pouch to a lowered position in which the bars straddle the top of such pouch, one of said bars being mounted relative to the other bar to swing toward and away from said other bar between open and closed positions about a second predetermined axis paralleling said first axis, a stationary cam track extending around at least part of said turret, a reversible actuator connected to each of said sealing heads and having an element which engages and moves along said cam track, said cam track being operable to shift said actuator first in one direction and subsequently in the opposite direction as said actuator moves along said cam track, said actuator including means for causing said bars to swing downwardly in unison to their lowered position when said actuator is first shifted in said one direction and for thereafter causing said one sealing bar to swing to its closed position when said actuator is subsequently shifted in said one direction, means for positively holding said one sealing bar in its closed position independently of said cam track for a period of time after said one sealing bar has been shifted to its closed position, and said actuator further including means for causing said one sealing bar to swing to its open position when said actuator is first shifted in said opposite direction and for thereafter causing said sealing bars to swing upwardly in unison to their raised position when said actuator is subsequently shifted in said opposite direction.

\* \* \* \* \*